Dec. 29, 1953 S. G. BRADY 2,664,080
TRIMMING MECHANISM FOR GRINDER WHEELS
Filed Jan. 16, 1953 2 Sheets-Sheet 1
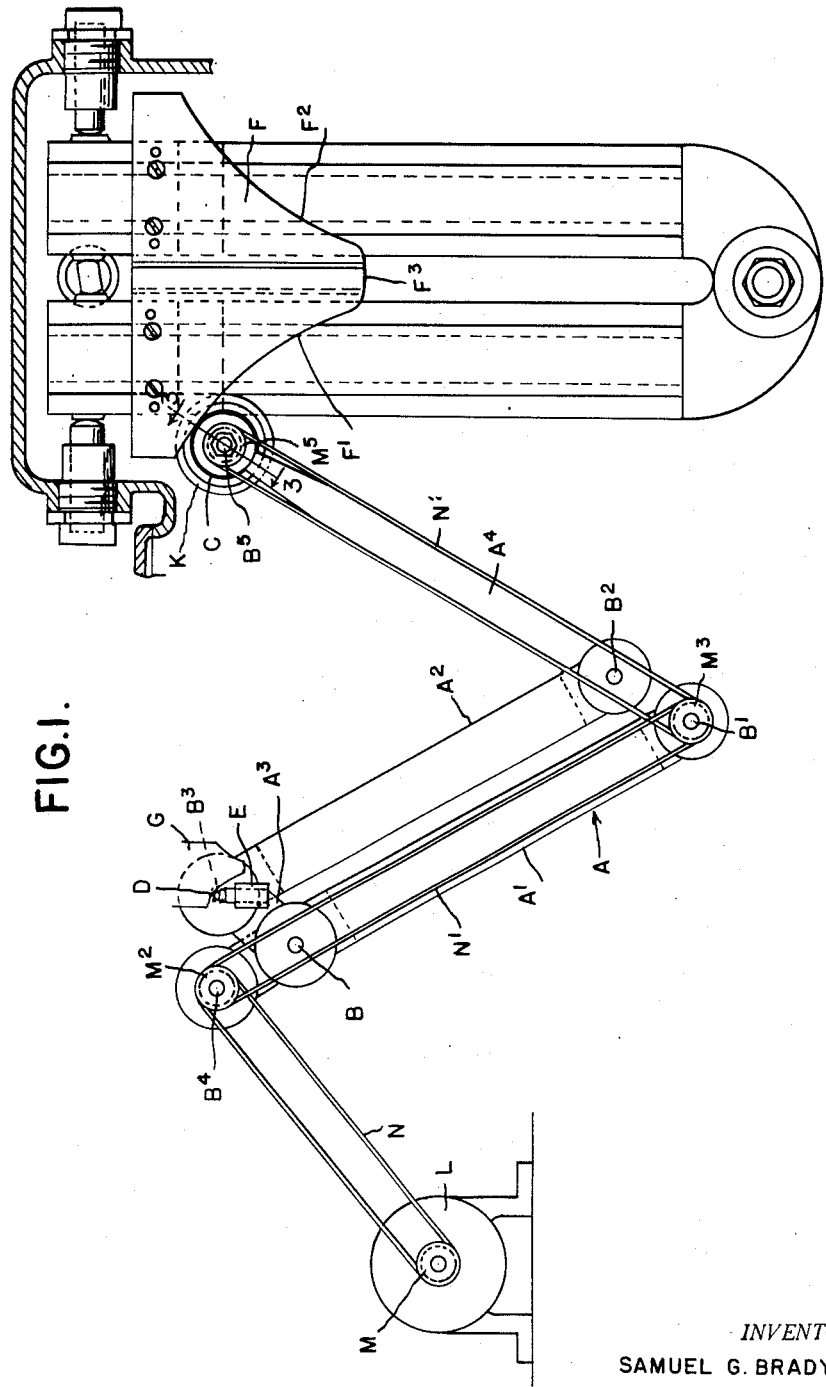
FIG.I.
INVENTOR.
SAMUEL G. BRADY
BY
Whittemore Hulbert & Belknap
ATTORNEYS Dec. 29, 1953 S. G. BRADY 2,664,080
TRIMMING MECHANISM FOR GRINDER WHEELS
Filed Jan. 16, 1953 2 Sheets-Sheet 2
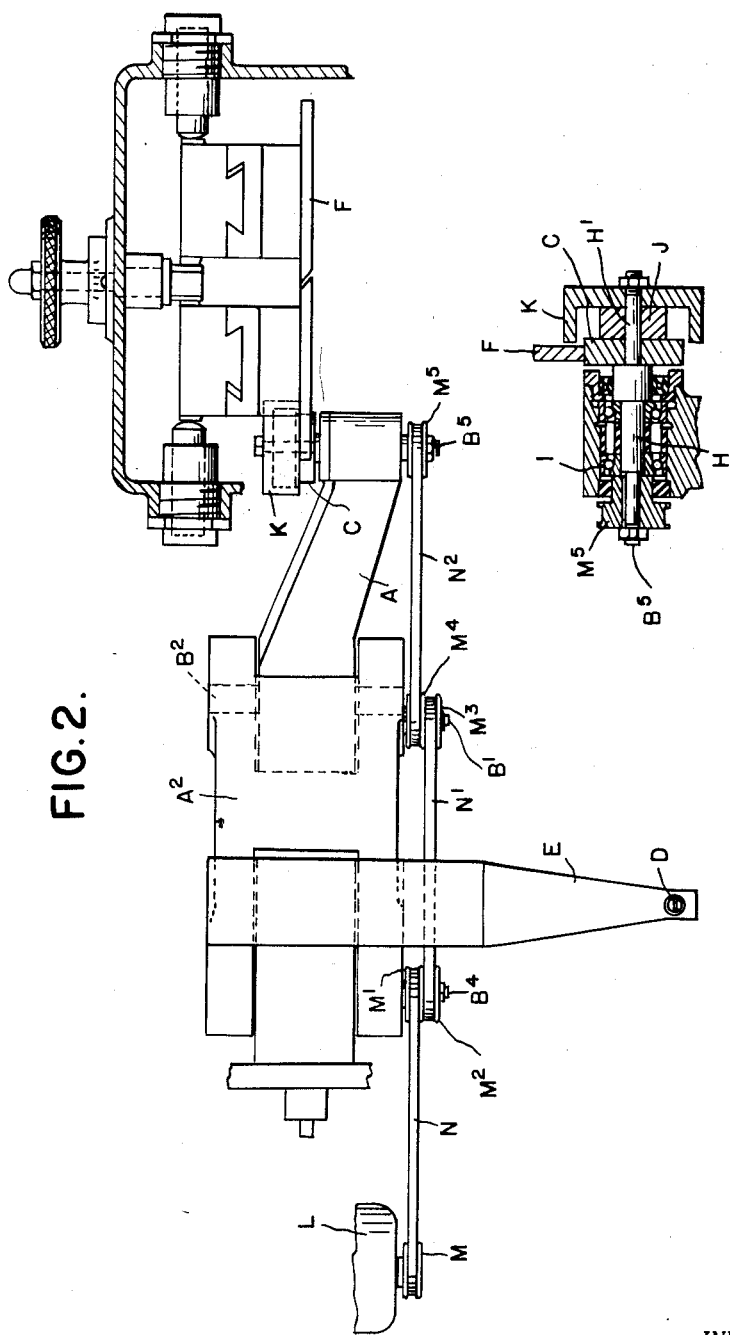
INVENTOR.
SAMUEL G. BRADY
BY
Whittemore Hulbert & Belknap
ATTORNEYS Patented Dec. 29, 1953

2,664,080

UNITED STATES PATENT OFFICE 2,664,080

TRIMMING MECHANISM FOR GRINDER WHEELS

Samuel G. Brady, Royal Oak, Mich., assignor to The Gear Grinding Machine Company, Detroit, Mich., a corporation of Michigan Application January 16, 1953, Serial No. 331,536

3 Claims. (Cl. 125—11)

The invention relates to trimming mechanism for grinder wheels and more particularly to that type in which the wheel is trimmed to a predetermined contour through the operation of a pantograph which carries the cutter and is guided in its movement by an enlarged pattern. Usually trimming mechanisms of such type are manually operated, the operator tracing the pattern by a contact point of the pantograph.

It is the object of the invention to provide automatic means for accomplishing the trimming, and to this end the invention consists in the construction as hereinafter set forth.

In the drawings:

Fig. 1 is a front elevation of the pantograph trimming mechanism in its relation to the grinder wheel to be trimmed and the guiding pattern;

Fig. 2 is a plan view thereof;

Fig. 3 is a cross section on line 3—3, Fig. 1.

As shown in Fig. 1, A is a pantograph having the arms A', A², A³, and A⁴ pivotally connected to each other at B, B', B² and B³ to form a parallelogram. The arm A' is extended beyond the pivot B to an anchor pivot B⁴. The arm A⁴ is extended beyond the pivot B² to a point B⁵ which is in a straight line intersecting the axis of the pivots B³ and B⁴. Due to the fact that the spacing between the parallel arms A' and A² is less than that between the arms A³ and A⁴ any pattern traced by the point B⁵ will be reproduced on a smaller scale by a point in the axis of the pivot B³. Also, a roller concentric with the point B⁵ and which travels over a pattern will reproduce the contour on a smaller scale by an arcuate surface concentric with the axis of the pivot B³ and which is of a radius proportionately smaller than that of the roller C. Thus, in the trimming mechanism the diamond cutter D is carried by a trimmer arm E which is an extension of the pivot B³, and the diamond preferably has an arcuate cutting edge concentric with the axis of the pivot B³ and of a radius proportionate to that of the roller C.

The pattern F for guiding the pantograph has two contour track portions F' and F² corresponding to opposite sides of a gear tooth and an intermediate portion F³ connects the portions F' and F². If the pantograph were to be manually operated, the roller C would be moved along the track successively over the portions F', F³ and F² thereof and then back again in the reverse direction, this being repeated as many times as necessary to complete the trimming. It is to be understood that the grinder wheel G which is to be trimmed is mounted in operative relation to the cutter D so that it may be advanced towards the diamond after each cut. However, as above stated, it is the object of the invention to provide automatic means for moving the pantograph which is of the following construction:

The roller C is pressed into frictional contact with the pattern track by any suitable means, but preferably this is accomplished by magnetic attraction. More specifically the roller C is mounted on a shaft H which is journaled in ball bearings I within the recesses in the arm A⁴. H' is a smaller diameter portion of the shaft H projecting beyond the bearings on which portion the roller is directly placed. J is a permanent magnet in the form of an annulus sleeved on the shaft portion H', the poles of said magnet being located at its opposite ends with one of them directly contacting with the roller C. On the opposite side of the magnet J is a cup-shaped member K, the flange of which encloses said magnet and extends in proximity to the side of the pattern F. The roller C, pattern F and cup-shaped member K are all made of magnetizable material, such as iron. The pattern F is preferably an iron plate having its edge fashioned to the desired contour, and the arrangement is such that when the roller C is in contact with the edge of the plate a complete magnetic circuit will be formed. This extends from one pole of the magnet J through the roller into the plate F and through the cup-shaped member K back to the other pole of the magnet. Consequently a strong magnetic attraction is developed between the roller and the plate producing sufficient friction so that if the roller is revolved it will travel along the pattern without slippage. If the roller is first in the position shown in Fig. 1, being at the upper end of the portion F' of the pattern, and counter-clockwise rotation is transmitted to the roller, it will travel successively over the portions F', F³ and F² to the upper end of the latter. If then the direction of rotation is reversed to be clockwise, the roller will travel back over these portions of the pattern to its original position.

For driving the roller and periodically reversing the same there is provided the following mechanism: L is a motor of any suitable construction which is mounted on a stationary support adjacent to the pantograph and out of its path of movement. M is a pulley driven by the motor either directly or through a transmission to turn at the desired speed, and N is a belt engaging the pulley M and extending to a pulley M' mounted on the pantograph in axial alignment with the pivot B⁴. A pulley M² coaxial with and attached to the pulley M' is connected by a belt N' to a pulley M³ coaxial with the pivot B'. A pulley M⁴ coaxial with and attached to the pulley M³ is connected by a belt N² with a pulley M⁵ on the shaft H. Thus, the rotation of the motor will through the belt and pulley transmission communicate rotation to the shaft H and the roller C. Reversal of the direction of rotation may be accomplished by reversing the motor or by any suitable reversing gear. Also, if desired, trips, not shown, may be placed in the path of the roller C or arm to which it is attached to automatically control the motor or reversing mechanisms.

With the construction above described the grinder wheel can be trimmed at any time with a little attention on the part of the operator other than to feed the wheel towards the cutter.

What I claim as my invention is:

1. In a trimming mechanism for form grinders including a plate having a fashioned edge forming a pattern and a pantograph having mounted thereon the trimming cutter and a follower roller for traversing the pattern and moving said cutter through a similar path; means for magnetizing said roller to hold the same in frictional contact with said pattern plate, a motor external to the pantograph, and transmission mechanism between said motor and said roller mounted on said pantograph and having elements thereof coaxial with the pantograph pivots, including the anchor pivot, whereby said roller is driven to traverse the pattern without interference with the articulation of the pantograph.

2. The construction as in claim 1 in which the motor is reversible.

3. The construction as in claim 1 in which said follower roller is mounted on a shaft journalled in a pantograph member to extend perpendicular to the plane of movement thereof and said magnetizing means includes a permanent magnet in the form of a sleeve having poles at opposite ends thereof and mounted on said shaft with one pole in contact with said roller, a cupped member mounted on said shaft in contact with the opposite pole of said magnet and having its peripheral portion enclosing the magnet and of larger diameter than said roller to overlap a face of said pattern plate, the latter and also said roller and cupped member being formed of magnetizable material whereby a substantially closed magnetic circuit is formed between the poles of the magnet including said roller and pattern to hold the same in frictional contact with each other.

SAMUEL G. BRADY.

References Cited in the file of this patent
UNITED STATES PATENTS

| Number | Name | Date |
|---|---|---|
| 1,059,329 | Bucknam | Apr. 15, 1913 |
| 1,352,760 | Plumley | Sept. 14, 1920 |
| 1,365,021 | Bucknam | Jan. 11, 1921 |
| 1,763,793 | Krebs | June 17, 1930 |
| 1,839,170 | Anderson | Dec. 29, 1931 |
| 1,981,117 | Oakley | Nov. 20, 1934 |
| 2,025,081 | Anderson | Dec. 24, 1935 |